US009317816B2

(12) United States Patent
Zeng et al.

(10) Patent No.: US 9,317,816 B2
(45) Date of Patent: Apr. 19, 2016

(54) EMAIL OPTIMIZATION FOR PREDICTED RECIPIENT BEHAVIOR: SUGGESTING CHANGES THAT ARE MORE LIKELY TO CAUSE A TARGET BEHAVIOR TO OCCUR

(71) Applicant: InsideSales.com, Inc., Provo, UT (US)

(72) Inventors: Xinchuan Zeng, Orem, UT (US); Kalyan Penta, Orem, UT (US); David Randal Elkington, Mapleton, UT (US)

(73) Assignee: InsideSales.com, Inc., Provo, UT (US)

( * ) Notice: Subject to any disclaimer, the term of this patent is extended or adjusted under 35 U.S.C. 154(b) by 0 days.

(21) Appl. No.: 14/503,240

(22) Filed: Sep. 30, 2014

(65) Prior Publication Data
US 2015/0347925 A1    Dec. 3, 2015

Related U.S. Application Data

(60) Provisional application No. 62/050,004, filed on Sep. 12, 2014, provisional application No. 62/003,544, filed on May 27, 2014.

(51) Int. Cl.
*G06N 99/00* (2010.01)
*H04L 12/58* (2006.01)

(52) U.S. Cl.
CPC .............. *G06N 99/005* (2013.01); *H04L 51/30* (2013.01)

(58) Field of Classification Search
CPC ........................... G06N 99/005; G06K 9/6256
USPC ......................................................... 706/12
See application file for complete search history.

(56) References Cited

U.S. PATENT DOCUMENTS

| 4,773,039 | A  | * | 9/1988  | Zamora ........................ 715/256 |
|-----------|----|---|---------|----------------------------------------|
| 8,712,944 | B1 |   | 4/2014  | Kim                                    |
| 2005/0097179 | A1 |   | 5/2005  | Orme                              |
| 2006/0069589 | A1 |   | 3/2006  | Nigam et al.                      |
| 2007/0112920 | A1 |   | 5/2007  | Hay                               |
| 2009/0198488 | A1 |   | 8/2009  | Vigen                             |
| 2010/0070554 | A1 |   | 3/2010  | Richardson et al.                 |
| 2010/0082751 | A1 |   | 4/2010  | Meijer et al.                     |
| 2010/0268716 | A1 |   | 10/2010 | Degaugue et al.                   |
| 2011/0014932 | A1 |   | 1/2011  | Estevez                           |

(Continued)

OTHER PUBLICATIONS

Neviarouskaya et alia. SentiFul: Generating a Reliable Lexicon for Sentiment Analysis. 3rd International Conference on Affective Computing and Intelligent Interaction and Workshops, 2009. ACII 2009. pp. 1-6. Sep. 10-12, 2009.*

(Continued)

*Primary Examiner* — Jeffrey A Gaffin
*Assistant Examiner* — Robert H Bejcek, II
(74) *Attorney, Agent, or Firm* — Hickman Palermo Becker Bingham LLP

(57) ABSTRACT

Techniques are described herein for predicting one or more behaviors by an email recipient and, more specifically, to machine learning techniques for predicting one or more behaviors of an email recipient, changing one or more components in the email to increase the likelihood of a behavior, and determining and/or scheduling an optimal time to send the email. Some advantages of the embodiments disclosed herein may include, without limitation, the ability to predict the behavior of the email recipient and suggest the characteristics of an email which will increase the likelihood of a positive behavior, such as a reading or responding to the email, visiting a website, calling a sales representative, or opening an email attachment.

18 Claims, 5 Drawing Sheets

(56) References Cited

U.S. PATENT DOCUMENTS

| | | | |
|---|---|---|---|
| 2011/0066692 A1 | 3/2011 | Ciancio-Bunch et al. | |
| 2011/0106895 A1 | 5/2011 | Ventilla et al. | |
| 2012/0209795 A1 | 8/2012 | Glickman | |
| 2013/0253910 A1 | 9/2013 | Turner et al. | |
| 2013/0297348 A1* | 11/2013 | Cardoza et al. | 705/3 |
| 2013/0325755 A1 | 12/2013 | Arquettee et al. | |
| 2014/0006611 A1 | 1/2014 | Perez | |
| 2014/0040010 A1 | 2/2014 | Garcia-Martinez | |
| 2014/0088944 A1* | 3/2014 | Natarajan et al. | 703/13 |
| 2014/0358828 A1 | 12/2014 | Phillipps et al. | |
| 2015/0058273 A1* | 2/2015 | Coden et al. | 706/52 |
| 2015/0058429 A1 | 2/2015 | Liu et al. | |

OTHER PUBLICATIONS

Neviarouskaya et alia. SentiFul: A Lexicon for Sentiment Analysis. IEEE Transactions on Affective Computing, Vol. 2, No. 1, 15 pages. Jan.-Mar. 2011.*

Free Online Spam Test, http://www.emailspamtest.com/, last viewed on Oct. 10, 2014, 1 page.

Bespalov et al., Sentiment Classification Based on Supervised Latent n-gram Analysis., CIKM'II, dated Oct. 24-28, 2011, 8 pages.

International Searching Authority, "Search Report" in application No. PCT/US15/32756, dated Oct. 23, 2015, 11 pages.

Current Claims in application No. PCT/US15/32756, dated Oct. 2015, 12 pages.

* cited by examiner

EMAIL OPTIMIZATION FOR PREDICTED RECIPIENT BEHAVIOR: SUGGESTING CHANGES THAT ARE MORE LIKELY TO CAUSE A TARGET BEHAVIOR TO OCCUR

CROSS-REFERENCE TO RELATED APPLICATIONS; BENEFIT CLAIM

This application claims the benefit of provisional application 62/003,544 filed May 27, 2014 and U.S. Provisional Application No. 62/050,004 filed Sep. 12, 2014, the entire contents of which are hereby incorporated by reference for all purposes as if fully set forth herein.

This application is related to U.S. patent application Ser. No. 14/503,149, filed Sep. 30, 2014, entitled "Email Optimization for Predicted Recipient Behavior: Determining a Likelihood that a Particular Receiver-Side Behavior will Occur", by Zeng et al., the entire contents of which is hereby incorporated by reference for all purposes as if fully set forth herein.

This application is related to U.S. patent application Ser. No. 14/503,263, filed Sep. 30, 2014, entitled "Email Optimization for Predicted Recipient Behavior: Suggesting Changes in an Email to Increase the Likelihood of an Outcome", by Zeng et al., the entire contents of which is hereby incorporated by reference for all purposes as if fully set forth herein.

This application is related to U.S. patent application Ser. No. 14/503,219, filed Sep. 30, 2014, entitled "Email Optimization for Predicted Recipient Behavior: Suggesting a Time at which a User should Send an Email", by Zeng et al., the entire contents of which is hereby incorporated by reference for all purposes as if fully set forth herein.

FIELD OF THE INVENTION

Techniques are described herein for predicting one or more behaviors by an email recipient and, more specifically, to machine learning techniques for predicting one or more behaviors of an email recipient, changing one or more components in the email to increase the likelihood of a behavior, and determining and/or scheduling an optimal time to send the email.

BACKGROUND

Due to convenience and popularity, electronic messages, such as emails, have become a major channel for communications amongst individuals and businesses. Since electronic messages can be used to reach a much wider audience in a short period of time, electronic messages have also been utilized regularly as a tool in sales and marketing campaigns. However, electronic messages are often sent without consideration for the optimal time at which to send the email, the likelihood that the email's components are likely to trigger filters designed to eliminate unsolicited email, or the likelihood that the email's components will lead to the recipient's taking the action desired by the email sender.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The accompanying drawings illustrate several example embodiments of the invention. Together with the description, they serve to explain the principles of the invention according to the embodiments. One skilled in the art will recognize that the particular embodiments illustrated in the drawings are merely exemplary, and are not intended to limit the scope of the present invention.

Figure 1:
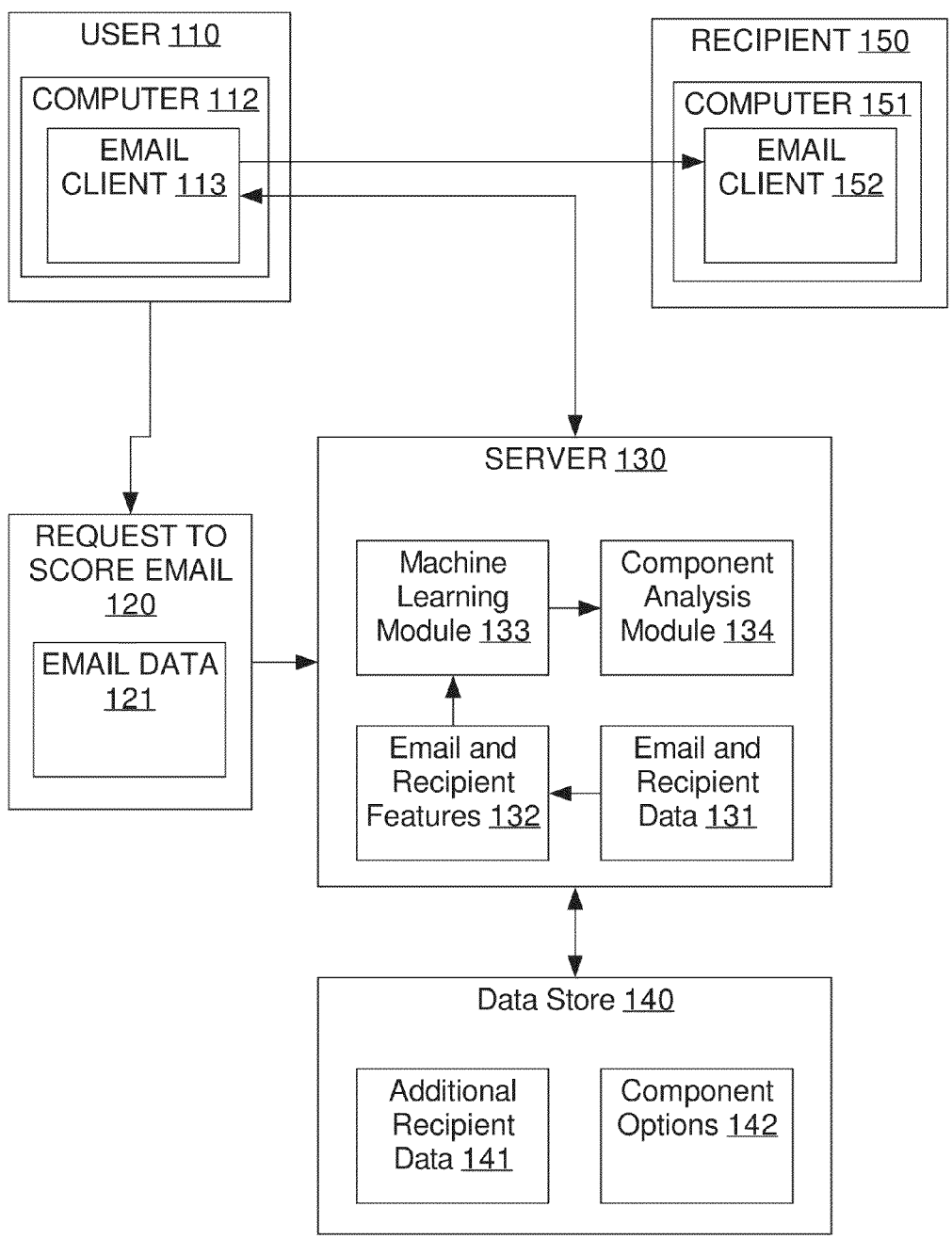
FIG. 1 illustrates a computer system, which may be configured to predict the behavior of one or more email recipients, in an example embodiment.

While each of the drawing figures illustrates a particular embodiment for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Terms

In some embodiments:

The term "email" may refer to any electronic message, such as a message sent through a texting system, a message sent through an email system, a message sent through an instant messaging system, a direct message, or any other message sent to any computing device.

The term "recipient" may refer to the computing device that receives an email and/or the user that receives and/or reads the email on such a computing device.

The term "behavior" may refer to an action taken, and/or not taken, by a recipient of an email. For example, a behavior may comprise opening and/or not opening an email, deleting and/or not deleting an email, classifying and/or not classifying an email as "spam", "junk", and/or any other category.

A "component" of an email may comprise one or more words and/or media in an email. For example, a component may be a word, phrase, sentence, paragraph, subject, and/or body of an email. Additionally or alternatively, a component of an email may include data associated with the email, such as a recipient, recipient identifier and/or address, behavior, computer, sender, and/or the server sending and/or receiving the email. Many more examples of components as discussed in detail herein.

The term "computer" may refer to be one or more physical computers, virtual computers, and/or computing devices. As an example, a computer may be one or more servers, cloud-based computers, a cloud-based cluster of computers, virtual machine instances or virtual machine computing elements such as virtual processors, storage and memory, data centers, storage devices, desktop computers, laptop computers, mobile devices, and/or any other special-purpose computing devices. Any reference to "a computer", "a server", "a client" or any other computer herein may mean one or more computers, unless expressly stated otherwise.

General Overview

Techniques are described herein for predicting one or more behaviors by an email recipient and, more specifically, to techniques for using machine learning to predict one or more behaviors of an email recipient, changing one or more components in the email to increase the likelihood of a behavior, and determining and/or scheduling an optimal time to send the email. Some advantages of the embodiments disclosed herein may include, without limitation, the ability to predict the behavior of the email recipient and suggest the characteristics of an email which will increase the likelihood of a positive behavior, such as a reading or responding to the email, visiting a website, calling a sales representative, or opening an email attachment.

One example embodiment predicts the likelihood of a recipient's target behavior related to an email based on characteristics of the individual, characteristics of the email, and previous interaction history between the recipient and the sender or others associated with the sender or recipient. A machine learning model is employed to evaluate the relevant email characteristics and the behavior associated with those characteristics, for example whether a recipient opened an email in the morning or the afternoon.

One example embodiment is comprised of a server configured to receive an input which includes at least a target behavior, such as opening an email. In this embodiment, the server is connected and/or communicatively coupled to a data store which includes recipients and their associated data. Behavior predictions may be based on data about an identified recipient, one or more other recipients related to the identified recipient, and/or one or more other recipients generally. Behaviors could include responding activities such as opening an email, responding to an email, making a phone call, accepting a phone call, visiting a website, setting an appointment, or completing a transaction.

Example Computer and Network Topology

FIG. 1 illustrates a computer system, which may be configured to predict the behavior of one or more email recipients, in an example embodiment. Server 130 receives request to score email 120, which includes email data 121. Email data 121 may include, among other things, a behavior, an identifier of an email recipient, and one or more components of an email. Server 130 is communicatively coupled to data store 140. From data store 140, server 130 retrieves additional recipient data 141 from data store 140.

Additional recipient data 141 may include a set of recipient data, such as name, address, phone number, email address, lead medium, referring search engine, referring key words, number of web pages visited, email domain, social network alias, job title, company name, source of object data, industry, salary, and/or other demographic information. Additionally or alternatively, recipient data 141 may also include data records regarding previous interactions with the object, such as recency of last attempt, recency of last contact, number of attempts, number of successful attempts, time since the record was created, if previous email(s) made contact, if previous email(s) were opened, and channels used to make contact. Channels used to make contact may include, but are not limited to, phone calls, emails, faxes, social media messages, and/or text messages.

Server 130 may combine email data 121 with additional recipient data 141 into email and recipient data 131. Server 130 may parses email and recipient data 131 into input features compatible with machine learning module 133. These input features become email and recipient features 132

Machine Learning Module

Machine learning module 133 may use email and recipient features 132 as input. Machine learning module 133 may determine or predict the probability that a particular behavior may happen and/or occur using a two-level prediction model. Machine learning module 133 may be a multi-layer perceptron ("MLP") neural network trained with backpropogation. Additionally or alternatively, one or more other machine learning models may be used.

Machine learning module 133 may score each component in an email using a correlation score corresponding to one or more recipient's behavior. The component scores may be compiled into a composite score to predict the overall likelihood of a specified and/or target behavior of the recipient. For purpose of illustrating a clear example, assume the following facts:

Two hundred emails are sent with the phrase "enhance your".

One of the two hundred emails with the phrase "enhance your" is determined to be opened.

Twenty emails are sent with the phrase "filed today".

Fifteen of the twenty emails with the phrase "filed today" are determined to be opened.

Machine learning module 133 may score the phrase "enhance your" as 0.005, because the samples indicate that 0.5% of emails with the phrase "enhance your" are opened. Alternatively, machine learning module 133 may score the phrase "enhance your" as −0.995 because the samples indicate that 99.5% of emails with the phrase "enhance your" are not opened. Machine learning module 133 may score the phrase "filed today" as 0.75, because the samples indicate that 75% of the emails with the phrase "filed today" are opened.

Machine learning module 133 may assign weights to the score for each phrase in the email, and use the combined score as the overall score for the draft email. For example, machine learning module 133 may assign 0.5 as a weight to both phrase scores and sum the product of each score and its weights. Thus, in this example, where the score for "enhance your" is 0.005 and the score for "filed today" is 0.75, the overall score for a draft email with both phrases may be 0.3775. The machine learning module may use different weights based on one or more algorithms and/or statistics, such as confidence intervals or number of samples. For example, the machine learning module may weigh the score associated with "enhance your" more heavily because there are more samples and/or a higher confidence interval associated with "enhance more" than "filed today". Also for example, the average time a recipient takes to act on an email with a particular component, such as opening the email and/or categorizing the email as spam, the more weight may be assigned to the particular component.

Machine learning module 133 may be optimized for a particular type of recipient. For example, machine learning module 133 may be optimized for a recipient employed in, and/or associated with, a particular industry and/or company by using historical data associated with the particular industry and/or company. Various ways in which the learning module 133 may be optimized for particular types of recipients is discussed in greater detail herein.

In one example embodiment, a user specifies a desired behavior (e.g. opening an email). Machine Learning Module 133 then predicts which components are most likely to lead to the desired behavior. To make the prediction, Machine Learning Module 133 scores the email components, where the higher the score assigned to a component, the more likely use of the component will result in the desired behavior. After score assignments, server 130 may suggest components to replace one or more of the components that are currently in an email. In general, such suggestions will be to replace components that have relatively lower scores with similar components that have relatively higher scores. In cases where a component is not present in the email that is to be sent, server 130 may suggest components that may be added to the email.

Predicting an Email Recipient's Behavior

Figure 2:
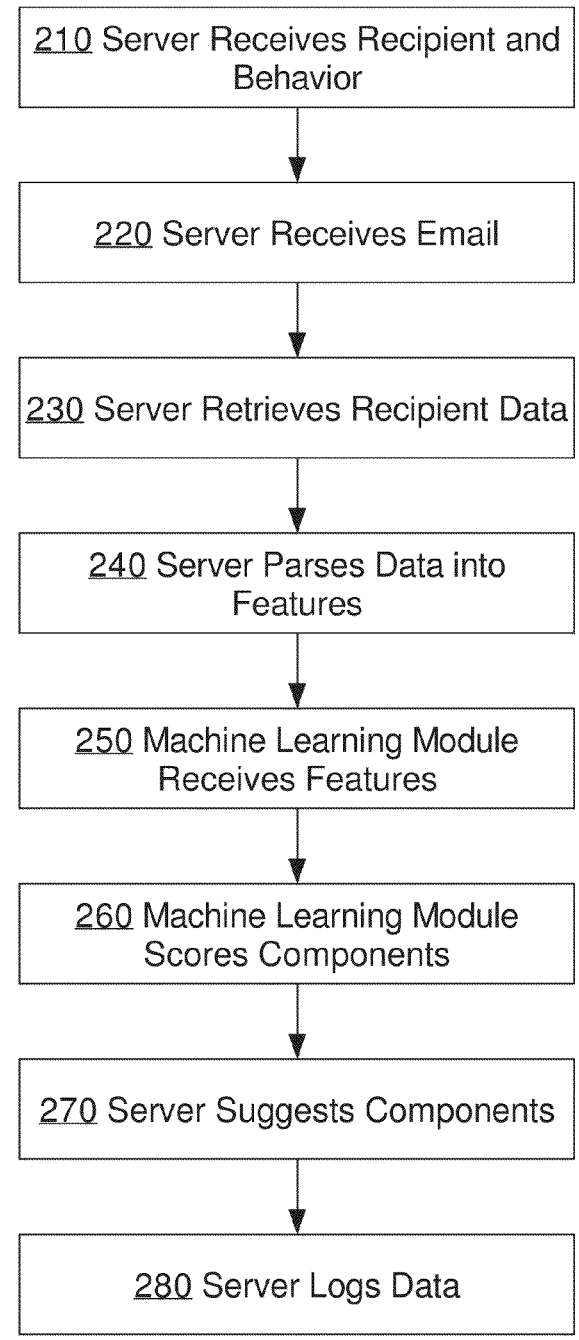
FIG. 2 illustrates a process for predicting an email recipient's overall target behavior and changing one or more components in the email to increase the likelihood of one or more behaviors, in an example embodiment.

FIG. 2 illustrates a process for predicting an email recipient's overall target behavior and changing one or more components in the email to increase the likelihood of one or more behaviors, in an example embodiment. The one or more behaviors may be the same or different than the overall target behavior. For example, the overall target behavior may be a recipient opening a draft email. However, components may be changed to increase the likelihood that the email will be opened and/or will not be marked as spam. At step 210, a server receives a target behavior to predict and the identity of an email recipient. For example, user 110 may send request to score email 120 from computer 112 to server 130. Request to score email 120 may include email data 121. For purposes of illustrating a clear example, assume email data 121 includes a draft email, identifies recipient 150 as the intended recipient of the draft email, and indicates that the desired behavior is that recipient 150 will open the draft email.

At step 220 the server receives components of the email, and retrieves data associated with the recipient. For example, server 130 receives request to score email 120.

At step 230 the server retrieves recipient data. For example, server 130 determines from email data 121 that the email is intended for recipient 150. In response, server 130 retrieves additional recipient data 141 regarding recipient 150 from data store 140. Server 130 may combine email data 121 and recipient data 141 regarding recipient 150 to generate email and recipient data 131.

At step 240, the server parses the retrieved data associated with the recipient into features suitable to send to a machine learning module. For example, server 130 generates email and recipient features 132 from email and recipient data 131. Email and recipient features 132 may include features that machine learning module 133 may use to make one or more predictions, and/or estimate the likelihood, for one or more behaviors.

At step 250, the machine learning module receives the parsed input features as well as data that indicates the target behavior. For example, if the recipient is a sales lead, the parsed input features may include: Job Title, Lead Medium, Lead Source, Lead Type, Phone Number, Email Address, Company Name, Company Website URL, Industry, Company Size, State, PPC Search Engine, PPC Network, PPC keyword, Weather Condition, Temperature, Humidity, Number of previous dial attempts, Number of previous emails sent, Number of previous voice mails left, Lead contacted by previous dial, Previous Email Opened, Time of Day of Previous Dial, Time of Day of Previous Email, Time of Day of next planned email, Hours since lead was created, Hours since previous dial, Hours since previous email, Lead has been contacted, and Previous email has been opened.

Scoring Email Components

At step 260, the machine learning module scores the components of the email based on the correlation between components in the email and the target behavior. Given a target behavior, an email, email components, and/or a recipient, a trained machine learning model, may determine a score indicating the likelihood that the recipient will perform the target behavior. For example, machine learning module 133 may score email components based on recipient features as one or more input features. The weighting of the features of machine learning module 133 may be determined by training. Machine learning module 133 may be periodically and/or automatically retrained using additional data.

A user may specify a behavior to be predicted for a particular draft email and/or components in the draft email. For example, request to score email 120 may request that server 130 and/or machine learning module 133 predict which components, and/or possible components, included in email data 121 are most likely to lead to a recipient opening an email. In response, machine learning module 133 may score each email component. Machine learning module 133 may predict which components are most likely to lead to the receipt to open the email. Server 130 may suggest that one or more components be replaced with one or more different components with a higher score. Additionally or alternatively, machine learning module 133 may suggest adding one or more additional components to increase the likelihood of a particular behavior. Each of the factors discussed herein may be determined for a draft email and/or used as a factor in determining the likelihood that one or more behaviors will occur in response to receiving the draft email.

Email Components

An email may comprise one or more components:

$$\text{Components}_p = \{\text{component}_{p_1}, \text{component}_{p_2}, \ldots, \text{component}_{p_L}\}$$

Email components may be demarcated in several ways. For example, the components may be a subject line, body, and a time that the email is scheduled to be sent.

An email may have one more recipients. Each recipient may have a number of features which can have various values, for example:

$$\text{RecipientData}_p = \left\{ \begin{array}{l} \text{UniqueID}_p, \text{Name}_p, \text{Address}_p, \text{State}_p, \text{ZipCode}_p, \text{Phone}_p, \\ \text{Email}_p, \text{Title}_p, \text{LeadSource}_p, \text{LeadType}_p, \text{CompanyName}_p, \\ \text{CompanyURL}_p, \text{CompanySize}_p, \text{Industry}_p, \\ \text{PPCSearchEngine}_p, \text{PPCNetwork}_p, \text{PPCKeyword}_p, \\ \text{HoursSinceLeadCreated}_p, \text{BehaviorData}_p \end{array} \right\}$$

UniqueID may be any unique identifier, such as a database record number and/or the channel of the source from which a lead was generated. Name may be the name of the recipient. Address may be the address of the recipient. State may be the state where the recipient is located. ZipCode may be the zip code where the recipient is located. Phone may be the phone number of the recipient. Email may be the email address of the recipient. Title may be the job title of the recipient. LeadSource may be the source of the information in the lead record, such as a trade show, a referral, internet marketing, and/or organic search. LeadType may be the type of communication channel the lead was initially contacted by, such as inbound, outbound, and/or marketing. CompanyName may be the name of the company where the recipient works. CompanyURL may be the universal resource locator for the website of the company where the recipient works. CompanySize may be the valuation, such as market cap, and/or the number of employees at the company where the recipient works. Industry may be a type of market where the company operates, such as software, manufacturing, retail, financial, and/or healthcare. PPCSearchEngine may be the search engine which displayed the pay-per-click ("PPC") ad that the recipient clicked. PPCNetwork may be the network which displayed the PPC ad that the recipient clicked. PPCKeyword may be the keyword which triggered the PPC ad to be displayed. HoursSinceLeadCreated may be a value representing the amount of time that has elapsed since the lead record was created.

BehaviorData may include:

$$BehaviorData_p = \{SearchTerms_p, WebPageVisted_p, WebPageCategory_p\}$$

SearchTerms may be the search terms the recipient used, which led to the creation of the lead record. WebPageVisited may be the web page or pages that were visited by the recipient, which led to the creation of the lead record. WebPageCategory may be the type of web page visited by the recipient, such as white paper, web form, or product description.

Recipient features may be used to retrieve interaction data and external data. Interaction data can include a number of different features and values, for example:

$$Interaction_p = \begin{Bmatrix} EmailAttempts_p, EmailsOpened_p, EmailTimeSent_p, \\ PreviousEmailOpened_p, HoursSinceLastEmail_p, \\ EmailOpenTime_p, PreviousDialAttempts_p, \\ PreviousVoicemails_p, ContactByPreviousDial_p, \\ DialTime_p, HoursSinceLastDial_p, LeadContacted_p \end{Bmatrix}$$

EmailAttempts may be the number of emails sent to the recipient. EmailsOpened may be the number of emails opened by the recipient. EmailTimeSent may be the time that an email was sent to the recipient. PreviousEmailOpened may be whether the recipient opened the most recent email and/or how many previous emails the recipient opened. EmailOpenTime may be the time that the recipient opened an email. PreviousDialAttempts may be the number of times the recipient has been called. Previous voicemails may be the number of voicemails previously left for the recipient. ContactByPreviousDial may be whether the recipient was contacted by a previous dial (or phone call), whether the recipient answered the most recent phone call, and/or how many previous phone calls the recipient answered. DialTime may be the time a dial attempt was made. HoursSinceLastDial may be the amount of time since there was an attempt to reach the recipient by phone. LeadContacted may be whether the recipient has been successfully contacted previously.

External Data

External data can include a number of different features, which may further include subsets of other data, for example:

$$ExternalData_p = \begin{Bmatrix} WeatherData_p, EconomicData_p, StockMarketData_p, \\ FinancingData_p, WebRank_p, AstronomicalData_p, \\ LunarData_p, CalendarData_p, GenderData \end{Bmatrix}$$

WeatherData may include the following features:

$$WeatherData_p = \begin{Bmatrix} WeatherCondition_p, Sky_p, Temperature_p, DewPoint_p, \\ Humidity_p, WindChill_p, WindSpeed_p, WindDirection_p, \\ HeatIndex_p, FeelsLike_p, QPF_p, POP_p, Snow_p, MSLP_p \end{Bmatrix}$$

WeatherCondition may be the current state of the weather in the locality of the recipient, such as rainy or sunny. Sky may be the current cloud conditions in the locality of the recipient, such as partly cloudy or clear. Temperature may be the current temperature in the locality of the recipient. DewPoint may be the current dew point in the locality of the recipient. Humidity may be the current humidity in the locality of the recipient. WindChill may be the current wind chill in the locality of the recipient. WindSpeed may be the current wind speed in the locality of the recipient. WindDirection may be the current wind direction in the locality of the recipient. HeatIndex may be the current heat index in the locality of the recipient. FeelsLike may be what the current temperature feels like in the locality of the recipient. QPF may be the current quantitative precipitation forecast in the locality of the recipient. POP may be the current probability of precipitation in the locality of the recipient. Snow may be the current state or amount of snowfall in the locality of the recipient. MSLP may be the current mean sea level air pressure in the locality of the recipient.

EconomicData may include the following features:

$$EconomicData_p = \begin{Bmatrix} CPI_p, GDP_p, RealGDP_p, RealDisposable_p, Dollar_p, \\ Mortgage_p, FedFund_p, IPI_p, Bond_p, \\ Unemployment_p, Euro_p, BondYield_p, CrudeOil_p, \end{Bmatrix}$$

CPI may be the current Consumer Price Index. GDP may be the current Gross Domestic Product. RealGDP may be the current Real Gross Domestic Product. RealDisposable may be the real disposable income per capita. Dollar may be the trade weighted US dollar index. Mortgage may be the 30-year mortgage rate. FedFund may be the Federal Fund rate. IPI may be the industrial production index. Bond may be the 10-year Treasury bond index. Unemployment may be the current unemployment rate. Euro may be the current US Dollar/Euro exchange rate. BondYield may be the current AAA corporate bond yield, CrudeOil may be the current price of a barrel of crude oil.

StockMarketData may include the following features:

$$StockMarketData_p = \begin{Bmatrix} TenMove_p, TenMovePerc_p, FiftyMove_p, FiftyMovePerc_p, \\ TwoHundMove_p, TwoHundMovePerc_p, YearHigh_p, \\ YearLow_p, YearPerc_p, Closing_p, DayMonth_p, Month_p, \\ Year_p, Exchange_p, AllHigh_p, Allow_p, OpenPrice_p, \\ Ticker_p, Volume_p, \end{Bmatrix}$$

TenMove may be the 10 day moving average. TenMovePerc may be the 10 day moving average percentage. FiftyMove may be the 50 day moving average. FiftyMovePerc may be the 50 day moving average percentage. TwoHundMove may be the 200 day moving average. TwoHundMovePerc may be the 200 day moving average percentage. YeahHigh may be the 52 week high. YearLow may be the 52 week low. YearPerc may be the 52 week high-low percentage. Closing may be the closing price. DayMonth may be the numerical day of the month. Month may be the name or number of the calendar month. Year may be the number of the calendar year. Exchange may be the exchange the company is listed on. AllHigh may be the all-time high price. AllLow may be the all-time low price. OpenPrice may be the day's opening price. Ticker may be the ticker symbol of the company. Volume may be the volume of trading for a specified period of time.

FinancingData may include the following features:

$$FinancingData_p = \begin{Bmatrix} Status_p, Industry_p, TransType_p, TransAmount_p, \\ StillSeek_p, MinInvest_p, MinIvestReq_p, \\ PreMoneyVal_p, TransRound_p, FundRound_p, \\ ProceedsPurpose_p, FundsPurpose_p, \end{Bmatrix}$$

Status may be the company status, such as private, public, or venture backed. Industry may be the industry the company operates in, such as software, manufacturing, retail, financial, and/or healthcare. TransType may be a previous transaction type, such as angel investment, venture capital funding, or acquisition. TransAmount may be the transaction amount of a previous transaction. StillSeek may be an investment amount a company is still seeking. MinInvest may be the minimum investment amount for the transaction. MinInvestReq may be whether a minimum investment is required to participate in a transaction. PreMoneyVal may be the pre-money or pre-investment valuation of the company. TransRound may be the round of a transaction. FundRound may be a funding round in which a transaction occurred. ProceedsPurpose may be the purpose for the proceeds of a transaction. FundsPurpose may be the purpose for raising funds.

WebRank may include the following features:

$$WebRank_p = \begin{Bmatrix} Website_p, Phone_p, Email_p, Street_p, State_p, Zip_p, Country_p, \\ SiteTitle_p, SiteDesc_p, SiteOnlineSince_p, LoadTime_p, \\ MedLoadTime_p, SpeedPerc_p, LinksIn_p, Keywords_p, \\ Domains_p, NumDomains_p, Subdomains_p, NumSubdomains_p, \\ CityRank_p, Rank_p, ThreeMonthRank_p, ThreeMonthRankDelta_p, \\ ThreeMonthReachRank_p, ThreeMonthReachRankDelta_p, \\ ThreeMonthPageRank_p, ThreeMonthPageRankDelta_p, \\ OneMonthRank_p, OneMonthRankDelta_p, \\ OneMonthReachRank_p, OneMonthReachRankDelta_p, \\ OneMonthPageRank_p, OneMonthPageRankDelta_p, \\ OneWeekRank_p, OneWeekRankDelta_p, \\ OneWeekReachRank_p, OneWeekReachRankDelta_p, \\ OneWeekPageRank_p, OneWeekPageRankDelta_p, \\ OneDayRank_p, OneDayRankDelta_p, \\ OneDayReachRank_p, OneDayReachRankDelta_p, \\ OneDayPageRank_p, OneDayPageRankDelta_p, DatePulled_p \end{Bmatrix}$$

Website may be the URL of the company website. Phone may be the phone number of the company or an individual at the company. Email may be the email address of the company or an individual at the company. Street may be the street in the address of the company or an individual at the company. City may be the city of the company or an individual at the company. State may be the geographic state of the company or an individual at the company. ZipCode may be the zip code of the company or an individual at the company. Country may be the country where the company or branch is located. SiteTitle may be the title of the website. SiteDesc may be the description of the website. SiteOnlineSince may be the time the site was initially online. LoadTime may be the time it takes for the website to load as it was most recently measured. MedLoadTime may be the median time it takes to load the site across all measurements. SpeedPerc may be the percentile of load time amongst all measured websites. LinksInCount may be the number of links pointed to a website and/or webpage in a website. Keywords may be the keywords of the website. Domains may be the domain names owned by the entity. NumDomains may be the number of domains the entity owns. Subdomains may be the subdomains the entity owns NumSubdomains may be the number of subdomains the entity owns. CityRank may be the website's rank by city. Rank may be the website's overall rank. ThreeMonthRank may be the website's rank based on number of unique visitors the site received in three months. ThreeMonthRankDelta may be the website's change in rank over three months. ThreeMonthReachRank may be the ranking of the portion of the internet that the site is reaching for three months. ThreeMonthReachRankDelta may be the change in ThreeMonthReachRank over three months. ThreeMonthPageRank may be the website's rank based on the raw number of page views the site received in three months. ThreeMonthPageRankDelta may be the change in ThreeMonthPageRank over three months. OneMonthRank may be the website's average rank for one month based on number of unique visitors. OneMonthRankDelta may be the website's change in rank over one month. OneMonthReachRank may be the ranking of the portion of the internet that the website is reaching for one month. OneMonthReachRankDelta may be the change in OneMonthReachRank over one month. OneMonthPageRank may be the rank based on the raw number of page views the site received in a week. OneMonthPageRankDelta may be the change in OneMonthPageRank over one month. OneWeekRank may be the website's average rank for one week based on a number of unique visitors. OneWeekRankDelta may be the website's change in rank over one week. OneWeekReachRank may be the ranking of the portion of the internet that the website is reaching for one week. OneWeekReachRankDelta may be the change in OneWeekReachRank over one week. OneWeekPageRank may be the rank based on the raw number of page views the site received in a week. OneWeekPageRankDelta may be the change in OneWeekPageRank over one week. OneDayRank may be the website's average rank for one day based on number of unique visitors. OneDayRankDelta may be the website's change in rank over one Day. OneDayReachRank and OneMonthReachRank may be the ranking of the portion of the internet that the website is reaching for one day and one month, respectively. OneDayReachRankDelta may be the change in OneDayReachRank over one day. OneDayPageRank may be the rank based on the raw number of page views the site received in a day. OneDayPageRankDelta may be the change in OneDayPageRank over one day. DatePulled may be the calendar date when the data was received.

AstronomicalData may include the following features:

$$AstronomicalData_p = \begin{Bmatrix} CivilDawn_p, CivilDawnUnix_p, CivilDusk_p, \\ CivilDuskUnix_p, NauticalDawn_p, NauticalDawnUnix_p, \\ NauticalDusk_p, NauticalDuskUnix_p, \\ AstronomicalDawn_p, AstronomicalDawnUnix_p, \\ AstronomicalDusk_p, AstronomicalDuskUnix_p, \\ Sunrise_p, SunriseUnix_p, Sunset_p, \\ SunsetUnix_p, Transit_p, TransitUnix_p, City_p, \\ State_p, ZipCode_p, TimeZone_p, Latitude_p, Longitude_p, \\ DayOfMonth_p, MonthOfYear_p, Year_p \end{Bmatrix}$$

CivilDawn may be when the sun reaches six degrees below the horizon in the morning. CivilDawnUnix may be the time of CivilDawn in UNIX time. CivilDusk may be the time when the sun reaches six degrees below the horizon in the evening. CivilDuskUnix may be the time of CivilDusk in UNIX time. NauticalDawn may be the time when the sun reaches 12 degrees below the horizon in the morning. NauticalDawnUnix may be the time of NauticalDawn in UNIX time. NauticalDusk may be the time when the sun reaches 12 degrees below the horizon in the evening. NauticalDuskUnix may be the time of NauticalDusk in UNIX time. AstronomicalDawn may be the time when the sun reaches 18 degrees below the horizon in the morning. AstronomicalDawnUnix may be the time of AstronomicalDawn in UNIX time. AstronomicalDusk may be the time when the sun reaches 18 degrees below the horizon in the evening. AstronomicalDuskUnix may be the time of AstronomicalDusk in UNIX time. Sunrise may be the time the sun reaches zero degrees on the horizon in the morning. SunriseUnix may be the time of Sunrise in UNIX time. Sunset may be the time the sun reaches zero degrees on the horizon in the evening. SunsetUnix may be the time of Sunset in UNIX time. Transit may be the time the sun reaches its highest point. TransitUnix may be the time of Transit in UNIX time. City may be the city within the state. State may be the state within the country. ZipCode may be the zip code. TimeZone may be the time zone. Latitude may be the global latitude coordinates for the location. Longitude may be the global longitude coordinates for the location. DayOfMonth may be the numerical day of the month. MonthOfYear may be the name or number of the calendar month. Year may be the number of the calendar year.

LunarData may include the following features:

$$LunarData_p = \{DayOfMonth_p, Month_p, Year_p, IllumPerc_p, WaneWax_p\}$$

DayOfMonth may be the numerical day of the calendar month. Month may be the name or number of the calendar month. Year may be the number of the calendar year, such as 2014. IllumPerc may be the illumination percentage of the moon. WaneWax may be an indication of whether the moon is waning or waxing.

CalendarData may include the following features:

$$CalendarData_p = \begin{Bmatrix} Year_p, Month_p, DayOfMonth_p, DayOfWeek_p, \\ JulianDay_p, UnixTimeStamp_p, JewishYear_p, \\ JewishMonth_p, JewishDayOfMonth_p, JewishMonthName_p, \\ MuslimYear_p, MuslimMonth_p, MuslimDayofMonth_p, \\ HinduDayofMonth_p, HinduMonthName_p, HinduMonth_p, \\ HinduDayofMonth_p, HinduMonthName_p, ChineseYear_p, \\ ChineseMonth_p, ChineseDayOfMonth_p, ChineseAnimal_p, \\ Chinese Element_p, HinduMonthName_p, FedHoliday_p, \\ TradingHoliday_p, LegalHoliday_p, LegalAreas_p, \\ LocalHoliday_p, LocalAreas_p, ChristianHoliday_p, \\ JewishHoliday_p, MuslimHoliday_p, HinduHoliday_p, \\ OtherHoliday_p, HolidayPriority_p, HolidayAreas_p, \end{Bmatrix}$$

Year may be the number of the calendar year. Month may be the name or number of the calendar month. DayOfMonth may be the numerical day of the calendar month. DayOfWeek may be the name or numerical day of the calendar week, such as 1 or Sunday. JulianDay may be the continuous count of days since the beginning of the Julian period. UnixTimeStamp may represent the UNIX time stamp as the running total of seconds since the beginning of the UNIX epoch, Jan. 1, 1970. JewishYear may represent the number of the year according to the Jewish calendar. JewishMonth may be number of the month according to the Jewish calendar. JewishDayOfMonth may represent the number of the day of the month according to the Jewish calendar. JewishMonthName may be name of the month according to the Jewish calendar. MuslimYear may represent the number of the year according to the Muslim calendar. MuslimMonth may be number of the month according to the Muslim calendar. MuslimDayOfMonth may represent the number of the day of the month according to the Muslim calendar. MuslimMonthName may be name of the month according to the Muslim calendar. HinduYear may represent the number of the year according to the Hindu calendar. HinduMonth may be number of the month according to the Hindu calendar. HinduDayOfMonth may represent the number of the day of the month for the day in question according to the Hindu calendar. HinduMonthName may be name of the month in question according to the Hindu calendar. ChineseYear may represent the number of the year according to the Chinese calendar. ChineseMonth may be number of the month according to the Chinese calendar. ChineseDayOfMonth may represent the number of the day of the month according to the Chinese calendar. ChineseCalendarElement may be the current Chinese zodiac element according to the Chinese calendar. ChineseCalendarAnimal may be the Chinese zodiac animal according to the Chinese calendar. FedHoliday may be whether the day is a federally recognized holiday. TradingHoliday may be whether the day is a holiday where stock market exchanges are closed. LegalHoliday may be whether the day is a holiday recognized by a government. LegalAreas may be the areas affected by LegalHoliday. LocalHoliday may be the whether the day is a holiday recognized by a local community. LocalAreas may be the areas affected by LocalHoliday. ChristianHoliday may be whether the day is a holiday on the Christian calendar. JewishHoliday may be whether the day is a holiday on the Jewish calendar. MuslimHoliday may be whether the day is a holiday on the Muslim calendar. HinduHoliday may be whether the day is a holiday on the Hindu calendar. OtherHoliday may be whether the day is a holiday on a calendar not currently specified in the set. HolidayPriority may be the relative importance of the holidays in the set. HolidayAreas may be the areas affected by the holiday.

GenderData may include the following features:

$$GenderData_p = \left\{ \begin{array}{l} Name_p, Gender_p, DataSource_p, Count_p, \\ ProbMale_p, TotalCount_p, MeanProbMale_p, \end{array} \right\}$$

Name may be the full name, partial name, and/or alias of the individual. Gender may be a classification of the individual's gender, such as male or female. DataSource may represent the source of the information. Count may be the number of times the name appears in the database for each of the countries represented. ProbMale may be the probability that the name represents a male for each of the countries. TotalCount may be the total number of times the name appears in the database regardless of country. MeanProbMale may be the mean probability that the name represents a male.

Figure 3:
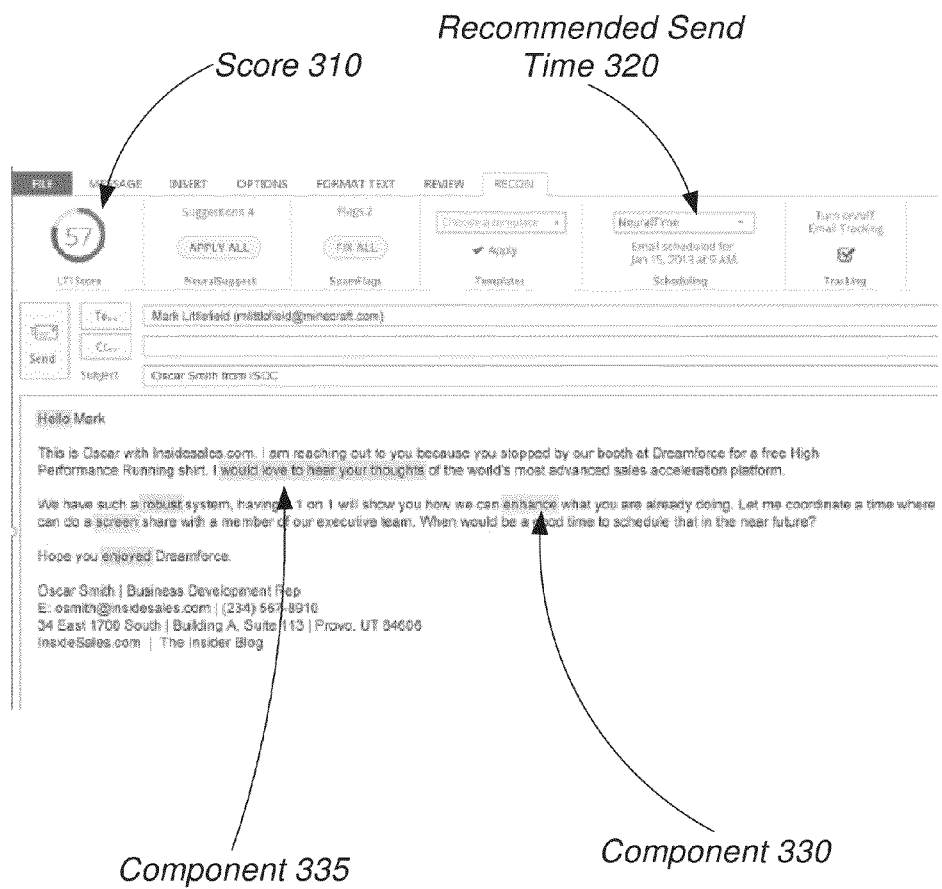
FIG. 3 illustrates an email client interface that may be presented to a user drafting an email and using one or more of the methods discussed herein in an example embodiment.

Suggesting Replacement Components, Optimized Sending Times, and Scores to a User At step 270, once the components are scored, the server may identify components with a relatively low score and suggest replacement components. FIG. 3 illustrates an email client interface that may be presented to a user drafting an email and using one or more of the methods discussed herein in an example embodiment. In FIG. 3, the email client includes a plugin. The plugin may send the draft email one or more times to a server via an Application Programming Interface ("API"). The server may comprise a machine learning module for predicting behaviors as discussed herein. In response to receiving the draft email, the server may return a score, a recommended send time, and component analysis.

The server may return, and the plugin may cause to display, score 310. Score 310 is a Likelihood to Interact ("LTI") score, which may indicate the likelihood one or more recipients identified in the draft email will perform a target behavior, such as open the email, respond to the email, and/or not classify the email as spam. Score 310 may be expressed as a percentage, or as a discrete classification, such as "likely" or "unlikely".

The server may return, and the plugin may cause to display, recommended send time 320. Recommended send time 320 may indicate the time at which one or more recipients are most likely to perform a target behavior. Additionally or alternatively, recommended send time may be the time that maximizes the LTI.

The server may return, and the plugin may cause to display, one or more components that the machine learning module recommends removing and/or changing. For example, the server may return a component that includes the word "enhance". The client may highlight instances of the word "enhance", such illustrated by component 330 in FIG. 3. The email server may receive, and cause to display, one or more alternatives or suggestions. The server may return a recommended time for each recipient in the draft email. Thus, the same email may be sent at a first time to one or more first recipients, and at a second time to one or more second recipients, even though the same email is originally addressed to the one or more first recipients and the one or more second recipients.

Components may be highlighted differently. For example, component 330 is highlighted with a different color than component 335, indicating that component 330 is more likely to cause the target behavior(s) to not occur, than component 335, and/or that component 335 is more likely to cause the target behavior(s) to occur than component 330. Additionally or alternatively, a first color may indicate that a component substantially improves the LTI score for the draft email, or that a score associated with the component is above a particular, and/or first, threshold; whereas a different color may indicate that a component substantially reduces the LTI score for the draft email, or that a score associated with the component is below a particular, and/or second, threshold. Additionally or alternatively, a component, such as component 335 that improves the LTI may be marked and/or highlighted with a color. Component 335 may be originally written by the email sender, but marked to indicate that the component improves the LTI and should be kept in the draft email if possible. Additionally or alternatively, component 335 may be inserted and/or suggested as a replacement component by the server, machine learning module, email client, and/or email client plugin. A component, such as component 330 that lowers the LTI, but is not associated with a replacement component that improves the LTI may be flagged. The flagged component may be highlighted. Additionally or alternatively, the flagged component, such as component 330, may be highlighted in a different color, and/or shade of a color, than components that improve the LTI as illustrated in FIG. 2.

Additionally or alternatively, a dropdown and/or popup menu may be displayed when a user selects a highlighted component. The dropdown and/or popup menu may display one or more replacement components.

An email client and/or an email client plugin may provide an interface for specifying one or more target behaviors. For example, email client 113, and/or a plugin, may provide one or more fields to specify an overall target behavior, such as a recipient opening an email, and one or more other behaviors, such as not marking the email as spam. Components highlighted in a first color may be suggested and/or flagged components associated with computing a likelihood that a first target behavior will occur, and components highlighted in a second, different color may be suggested and/or flagged components associated with computing a likelihood that a second, different target behavior will occur.

Detecting Results and Retraining the Model

At step 280, the server retrains the machine learning model based on data recorded from the results of activity related to the ranked objects. For example, an email and/or components of the email may be sent through server 130 to one or more recipients. Server 130 may store the time at which the email was sent. Additionally or alternatively, server 130 may embed a reference in the email to an image stored on server 130. The reference may identify the email and or components of the email. When the email is opened the recipient's email client, such as email client 152, may request the image from server 130. Server 130 may thus determine that the particular email was opened. For each recipient of a particular draft email, server 130 may send a different reference to the image. Thus, server 130 may determine if or when each recipient opened the particular draft email after the draft email is sent. Server 130 may store the data in data store 140 and/or use the data to train machine learning module 133, or a model in machine learning module 133.

Additionally or alternatively, the sender's email client, such as email client 113, and/or a plugin in the sender's email client, may request and/or embed the one or more image references from server 130. When the sender's email client sends the email, then the sender's email client, and/or a plugin, may notify server 130 of the time at which the email was sent. Server 130 may store the data in data store 140 and/or use the data to train machine learning module 133, or a model in machine learning module 133.

Additionally or alternatively, an email client, and/or a plugin in an email client, may notify the server when the email client receives, classifies/categorizes, stores, opens, and/or presents an email to a user. The server may store the data in a data store and/or use the data to train machine learning module 133, or a model in machine learning module 133.

Suggesting Alternative Text for a Targeted Behavior

A user may send a draft email, and/or components of a draft email, to a server and receive one or more alternative wordings that are predicted to elicit one or more target behavior by one or more recipients. Embodiments discussed herein may be used to build a machine learning ("ML") model to suggest alternative text that optimizes certain performance metrics (such as email open rate, email click-through rate, email response rate, lead qualification rate, lead conversion rate, deal opportunity crating rate, deal closing rate, deal size, etc.). For example, methods and systems discussed herein may be used to suggest alternative text for the subject field in a draft email that is more likely to cause a recipient to open and/or respond to the email. The suggestion may be based, at least in part, on an ML model trained from historical training data, such as previously sent emails. The methods and systems discussed herein may be implemented on one or more computer systems, such as the systems discussed in FIG. 1 and FIG. 5, which are discussed in detail herein.

Figure 4:
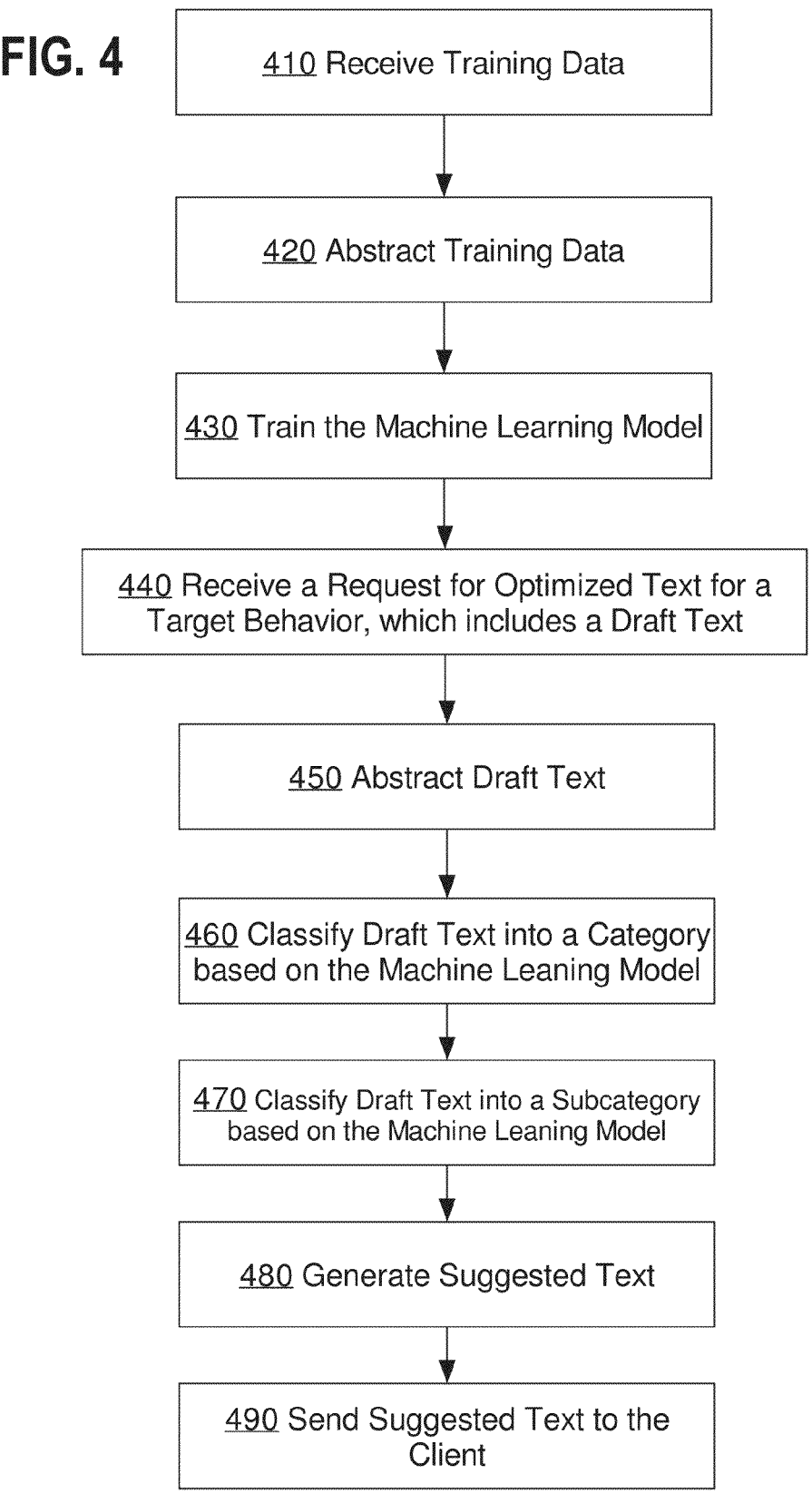
FIG. 4 illustrates a process for suggesting text that is more likely to cause a recipient to perform a target behavior in an example embodiment.

FIG. 4 illustrates a process for suggesting text that is more likely to cause a recipient to perform a target behavior in an example embodiment. For purposes of illustrating a clear example, the following examples discuss receiving a draft subject line from a draft email, and suggesting one or more alternative subject lines for the draft email that are predicted to be the most likely to cause a recipient to open an email. However, as discussed herein, the methods and systems discussed herein can be used for other texts, fields, subtexts, and/or any other content and/or target behavior(s). For convenience of expression, a "subject line" may be text from an email that was included in a "subject" field.

In step 410, a server receives training data. For example, server 130 may receive training data from data store 140 comprising a plurality subject lines from previously sent emails. Each subject line may be associated with one or more target behaviors and a score for each associated target behavior, which may indicate how likely a recipient will perform the target behavior. The score may be a percentage and/or another metric that indicates how likely a target behavior will be performed by a recipient based on a particular subject line compared to other subject lines. Additionally or alternatively, a score may be some value that represents various tiers, such as "very likely", "likely", "not likely", and "very unlikely".

In step 420, the server abstracts the text in the training data. Abstracting text may comprise performing one or transformations on the text, such as name entity recognition ("NER"), part of speech ("POS") tagging, lemmatization, other ML technique(s), and/or other NLP technique(s). One or more texts stored in data store 140 may be abstracted already. However, server 130 may, but need not, perform one or more additional abstraction techniques on the already abstracted text(s).

Abstractions allow for texts that are slightly different to be identified as the same text. For example, "How are you Trudy?" and "How are you Ted?" are similar, and may be abstracted to "How are you PERSON<noun>". For statistical purposes, the abstracted texts may be treated as the same text. Thus, if the text sent to Trudy was viewed and the text sent to Ted as not viewed, then the abstracted text may have a score of 50% for the targeted behavior of viewing the text. Additionally or alternatively, the abstracted texts may be used for one or more other purposes, such as matching, category modeling and/or classifying.

Named Entity Recognition ("NER")

NER takes text as input and identifies one or more entities or nouns, such as locations, times, persons, organizations, money, percentages, dates, and/or any other nouns, and replaces the entities with generalized labels. For example, machine learning module 133, using an NER model, may transform "XYZ Corporation selling movie tickets at half price" into "COMPANY selling movie tickets at PRICE".

Part of Speech ("POS") Tagging

POS tagging identifies one or more words within a text as one or more components of speech. For example, machine learning module 133, using POS tagging, may tag, from the sentence "XYZ Corporation selling movie tickets at half price", XYZ Corporation as a subject and/or a noun, "selling" as a verb, "movie tickets" as an object and/or a noun, and "half off" as a noun. Machine learning module 133 may replace one or more words in a set of text with the POS tags, and/or store the tags as metadata that is associated with the text and identifies which word(s) are tagged with which tag(s).

Lemmatization

Lemmatization determines the lemma and/or base form of a given word, for one or more words in a text. For example, machine learning module 133, using lemmatization, may transform "selling", in "XYZ Corporation selling movie tickets at half price", into "sell", and "tickets" into "ticket". In this example, machine learning module 133 modified two words: "selling" and "tickets"; however, machine learning module 133 may lemmatize one or more words in a text.

Training the Machine Learning Model

Returning now to FIG. 4, in step 430, the server trains the machine learning model. For example, the server may assign each abstracted text to a category and/or subcategory, and identify representative features of each category and/or subcategory.

Category Modeling

Categories can be generated automatically from training data and/or user input. Additionally or alternatively, text can be assigned to categories automatically and/or based on user input. For example, machine learning module 133 may generate a plurality of topics and assign each abstracted subject line from data store 140 to a topic using one or more techniques, such as topic modeling, NLP, clustering, and/or any other ML techniques. Additionally or alternatively, a user may define one or more categories (or topics in this example), and assign one or more texts to a category. For purposes of illustrating a clear example, assume machine learning module 133 generated at least the following two topics: "Initial Contact Emails" and "Promotions", each of which are associated with a plurality of abstracted subject lines.

Representative features may be determined automatically and/or manually for each category after the texts have been assigned to categories. The representative features may be used to determine which categories a draft text should be classified as. For example, machine learning module 133 may extract from each category a set of bi-words using one or more ML and/or NLP techniques. Accordingly, each category may be associated with a vector of bi-words, wherein each element in the vector has a score that corresponds with a bi-word. For convenience of expression, vectors will be represented as <bi-word 1: score; bi-word 2: score, . . . >.

Bi-words are pairs of words that are most likely to be next to each other in a particular category. Each bi-word may be associated with a score that indicates how likely, or the likelihood, that a text with the bi-word belongs, and/or does not belong, to the corresponding category. For example, text with the bi-word "my name" may be likely to be in the "Initial Contact Emails" topic, and text with the bi-word "are selling" may be likely to be in the "Promotions" topic. Some bi-words may be in, or associated with, more than one topic. For example, "low price" may be a bi-word that is associated with both the "Initial Contact Emails" topic and the "Promotions" topic.

A bi-word associated with a score that has an opposite sign may indicate that text with the bi-word is not likely to be in the associated category. For example, a negative score associated with a bi-word, which is associated with a particular category, may indicate that text with the bi-word is unlikely to be in, or has a likelihood that the text is not in, the particular topic. Additionally or alternatively, the score may range from zero to one. A small score, such as 0.05, may indicate text with the bi-word is not likely to be in the associated category; while a large score, such as 0.9, may indicate text with the bi-word is likely to be in the associated category.

The same bi-word may have a different score for each topic the bi-word is associated with. For example, "are selling" may have a score of 0.5 for the "Initial Contact Emails" topic and a score of 0.75 for the "Promotions" topic. Thus, in this example, a text with the bi-word "are selling" is unlikely to be in the Initial Contacts Emails topic, but likely to be in the Promotions topic.

While the examples herein use one or more bi-words, additionally or alternatively, the methods and systems discussed herein may be used with one or more n-words, where n is any number larger than one. A bi-word or n-word may be referred to as a bi-gram or n-gram.

Subcategory Modeling

Subcategories may be generated automatically from training data using ML based modeling, topic modeling, NLP, clustering algorithm, and/or any other ML technique(s). For example, the abstracted subject lines that are classified into the same subject and closest to each other may be clustered into a subtopic of a plurality of subtopics within the topic. "Distance" or "closeness" may be determined based, at least in part, on one or more methods. For example, the closeness between two texts may be the number of exact and/or similar words in both texts and/or abstracted texts. Two words may be deemed to be similar if the two words are synonymous. Additionally or alternatively, subcategories may be generated and/or defined, at least in part, by one or more users and/or user inputs.

Receiving a Request for Optimized Text

Returning now to FIG. 4, in step 440, the server receives a request for optimized text for a target behavior, which includes draft text. For example, machine learning module 133 may receive a draft subject line written by user 110 from email client 113. For purposes of illustrating a clear example assume the draft subject line is "Wonderful children are selling coupon booklets for a super low price". Additionally or alternatively, the request may include a target behavior. Additionally or alternatively, the target behavior may be implied. For example, machine learning module 133 may assume, unless expressly stated in the request otherwise, that the target behavior is that a recipient will open and/or read a message.

Classifying the Draft Text into a Category

In step 450, the server abstracts the draft text. For example, machine learning module 133 may abstract the draft subject line based on or more techniques discussed herein, such as lemmatization, to produce "Wonderful child are sell coupon booklet for PRICE".

In step 460, the server classifies the draft text into a category based on the machine learning model. There are many way of classifying the subject line into a category. For purposes of illustrating a clear example, assume the following:

There are at two the following two topics: "Initial Contact Emails" and "Promotions";
The Initial Contact Emails topic has two representative bi-words: "my name" and "for PRICE";
A first vector is associated with the Initial Contact Emails topic:
< "my name": 10; "for PRICE": 20 >;
The Promotions topic has two representative bi-words: "are sell" and "for PRICE"; and
A second vector is associated with the Promotions topic:
< "is sell": 10; "for PRICE": 30 >.

The bi-word "for PRICE" has a higher score for the Promotions topic than the Initial Contact Emails topic, indicating that a subject line with the bi-word "for PRICE" is more likely to be in the Promotions topic than the Initial Contact Emails topic.

Machine learning module 133 may parse the abstracted subject line into a set of bi-words: "Wonderful child", "child are", "are sell", "sell coupon", "coupon booklet", "booklet for", and "for PRICE".

Machine learning module 133 may compare each bi-word in the set of bi-words to the bi-words in the two vectors, creating two exact match vectors. For example, machine learning module 133 may create a first exact match vector that corresponds to the first vector:

< "my name": 0; "for PRICE":20 >.

The value that corresponds to "my name" is zero because "my name" is not a bi-word found in the abstracted draft subject line. The value that corresponds with "for PRICE" is 20 because "for PRICE" is a bi-word found in the abstracted draft subject line and has a score of 20 associated with the Initial Contact Emails topic.

Machine learning module 133 may create a second exact match vector that corresponds to the second vector:

< "is sell": 0; "for PRICE": 30>.

The value that corresponds to "is sell" is zero because "is sell" is not a bi-word found in the abstracted draft subject line. The value that corresponds with "for PRICE" is 30 because "for PRICE" is a bi-word found in the abstracted draft subject line and has a score of 30 associated with the Promotions topic.

Machine learning module 133 may determine whether each bi-word in the set of bi-words is similar to the bi-words in the two vectors. For example, "of" may be deemed to be synonymous and/or similar to "for", and "is" may be deemed to be synonymous and/or similar with "are". Thus, machine learning module 133 may create a first similar match vector that corresponds to the first vector:

< "my name": 0; "for PRICE":0 >.

The value that corresponds to "my name" is zero because, in this example, neither "my" nor "name" are deemed similar to another word, which may form a new bi-word that is found in the draft subject line. The value associated with "for PRICE", is zero because replacing words in "for PRICE" with words that are deemed similar, such as "of" in this example, do not form a bi-word (e.g., "of PRICE") that is found in the abstracted draft subject line.

Machine learning module 133 may create a second similar match vector that corresponds to the second vector:

< "is sell": 10; "for PRICE": 0>.

The value that corresponds to "is name" is 10 because, in this example, "are" is deemed similar to "is", and can be used to find a bi-word that is found in the abstracted draft subject line (i.e., "are sell") and "is sell" has a score of 10 associated with the Promotions topic. The value associated with "for PRICE", is zero because replacing words in "for PRICE" with words that are deemed similar, such as "of" in this example, do not form a bi-word (e.g., "of PRICE") that is found in the abstracted draft subject line.

Machine learning module 133 may combine the scores in the elements of the exact vectors and similar vectors to generate a set of combined vectors. For example, machine learning module 133 may add the elements of the first exact vector and the first similar vector, respectively, to generate the following first combined vector:

< "my name": 0; "for PRICE": 20 >.

Machine learning module 133 may add the elements of the second exact vector and the second similar vector, respectively, to generate the following second combined vector:

< "is sell": 10; "for PRICE": 30 >.

In the above example, the elements of each combined vector were a sum of the corresponding elements in the corresponding exact vector and similar vector, respectively. Additionally or alternatively, if two corresponding elements in the exact vector and the similar vector are both non-zero, then the value of the corresponding element in the combined vector may be the product of the corresponding element in the exact vector and the corresponding element in the similar vector. In an embodiment, an element in the combined vector is the product of a corresponding element in the exact vector and the similar vector. In the above example, there was an exact vector and a similar vector for each topic. Additionally or alternatively, there may be more than one similar vector for each topic.

Machine learning module 133 may sum, multiply, take the average of, and/or perform any other mathematical operation on the values in each combined vector to determine a category score. Machine learning module 133 may use the category score to determine, at least in part, which category the draft subject line should be assigned. Continuing with the current example, the total score for the Initial Contact Emails topic is 20, which is the sum of the elements in the first combined vector. The total score for the Promotions topic may be 40, which is the sum of the elements in the second combined vector. Accordingly, in the current example, machine learning module 133 may assigned the draft subject line "Wonderful children are selling coupon booklets for a super low price" to the Promotions topic, because the category score for Promotions is greater than the category score for the Initial Contact Emails topic.

Classifying the Draft Text into a Subcategory

Returning now to FIG. 4, in step 470, the server classifies the draft text into a subcategory based on the machine learning model. For example, machine learning module 133 may use the draft subject line and/or the abstracted draft subject line to classify the draft subject line into a subtopic in the Promotions topic using one or more of the methods discussed herein. For purposes of illustrating a clear example, assume there is a plurality of subtopics in the Promotions topic, and each subtopic has a plurality of subject lines. Machine learning module 133 may determine a closeness score for each subtopic by computing how close the draft subject line and/or the abstracted draft subject line is to each subject line in each subtopic. Machine learning module 133 may classify and/or assign the draft subject line to the subtopic with the highest average closeness score. Additionally or alternatively, machine learning module 133 may classify and/or assign the draft subject line based, at least in part, on the highest closeness score for each subtopic, the sum of closeness score for each subtopic, and/or any other method and/or operation.

Generating an Suggested Text

In step 480, the server generates one or more suggested texts. Suggested text may be generated many ways. For purposes of illustrating a clear example of generating a suggested subject line, assume the following:

The draft subject line was assigned to a particular subtopic in the Promotions topic;

The subtopic comprises a plurality of subject lines that each have a score associated with the target behavior, which in this example is opening an email;

The score for each subject line in the subtopic is calculated based, at least in part, on statistics indicating how often the target behavior was performed by a recipient, which in this example is the ratio of how many recipients opened an email with the subject line over the number of times an email with the subject line was sent.

The subject line with the highest score for the target behavior (the "selected subject line") is "XYZ Corporation selling movie tickets at half price";

The abstracted, selected subject line is "COMPANY<subject, noun> <verb> <object, noun> at PRICE<noun>"; and The abstracted, draft subject line is "<adjective> <subject, noun> are <verb> <object, noun> for PRICE<noun>".

Machine learning module 133 may replace words/components in a selected subject line with words/components from the draft subject line. Machine learning module 133 may replace one or more words in the abstracted selected subject line with one or more words in the draft subject line that have the same one or more tag(s) to generate the following suggested text: "Children selling coupon books at low price". "COMPANY<subject, noun>" in the selected subject line was replaced with "children" from the draft subject line because "COMPANY" and "children" were both tagged as a subject and a noun. The "c" in "children" was changed to an uppercase "C" because "Children" was the first word in the subject. For purposes of illustrating a clear example, tags such as <subject, noun> and <verb> were embedded in the selected and draft subject lines. However, pointers and/or other metadata may be used to store one or more location of one or more tags in one or more selected and/or drafted texts.

In the above example, the server generates a suggested subject line. However, the server may generate more than one subject line. For example, the server may generate a subject line based on each of the one or more subject lines in the subtopic that are associated with a score for the target behavior above a particular threshold. Also for example, the server may generate a subject line based on each of the top N subject lines with the highest score for the target behavior in the subtopic, where N is some value greater than zero.

Send the Generated Text to the Client

In step 490, the server sends the suggested text to the client. For example, server computer 130 may send email client 113 the newly generated subject line. Server computer 130 may send email client 113 the score associated with selected subject line used to generate the suggested subject line (the "suggested score"). Email client 113 may replace the subject line drafted by user 110 with newly generated subject line. Additionally or alternatively, email client 113 may present, through a display or other electronic output device, the newly generated subject line to user 110. Email client 113 may receive user input from user 110 indicating that user 110 wants to replace the draft subject line with the newly generated subject line.

Email client 113 may present the suggested score for the suggested subject line. If the newly generated subject line is the same as the draft subject line, then email client 113 need not present the newly generated subject line as an alternative subject line. However, email client 113 may present the suggested score.

If the server generates more than one suggested subject line, then the server may send each of the suggested subject lines to the email client to be presented to the user and/or used in the email. The server may include, and the email client may present to a user, the suggested score for each suggested subject line.

If the server determines there is an exact match between a particular suggested subject line and the draft subject line, even if there are one or more suggested subject lines with higher suggested scores, then the server may send the suggested score for the particular suggested subject line. The email client may present the suggested score indicating the likelihood the draft subject line will cause a recipient to perform the targeted behavior.

As discussed herein, the target behavior may be implied. For example, the default target behavior for an email client may be that the recipient(s) of a message with open the message. Additionally or alternatively, the target behavior may be set by a user via a menu and/or button in an email and/or other messaging client.

Scheduling an Email

A user may desire to schedule a time to send an email to increase the probability that the recipient will open the email. For example, the user submits a request to score the email based on the recipient behavior of opening the email. The server receives the request and the email data, which includes the target behavior of opening the email, the email address of the recipient, and the components of the email. One of the components of the email may be the time the email is scheduled to be sent.

The server uses the email address of the recipient to retrieve additional recipient data, such as the records of previous attempts to contact the recipient and the local conditions of the recipient, including weather conditions. The server parses the additional recipient data, the email components, and the target behavior of opening the email into input features for a machine learning model which has been previously trained to predict the behavior of email recipients. The email components may include words and phrases from the subject and body of the email, and time the email is scheduled to send.

The machine learning model scores each component and indicates which components have low correlation to a likelihood of the recipient to open the email. The Server may then retrieve component options from a data store to replace components with a low score, or add components that would increase the score. More particularly, the time the email is scheduled to send may have a low correlation to a recipient opening the email, or the time may be missing altogether. The server computer, using the machine learning model, may score a set of available times to schedule and the server can provide the top options to the user.

A user may desire to schedule a time to send an email to increase the probability that the recipient(s) will open the email at a particular time. For example, the user submits a request to a server to score the email based on the recipient behavior of opening the email. The server receives the request and the email data, which includes the target time of opening the email, the email address of the recipient, and the component(s) of the email. The server computer, using the machine learning model, may score a set of available times which are the most likely to cause the recipient(s) to open the email at a particular time. If more than one recipient is identified in the draft email, then the server may determine a different sending time for each intended recipient.

A user may desire to schedule a time to send an email within a particular window of time. The window need not be contiguous. For example, a user may wish to send an email no later than 72 hours from a particular time, not including weekends. The server, using the machine learning model, may predict one or more times within the 72-hour window, which does not include weekends, at which the recipient(s) are most likely to open the email.

The server may round times up or down. For example, the server may round previous time(s) at which a user has opened an email to the nearest hour or half-hour. The server may round previous time(s) at which an email was sent to the nearest hour or half-hour. The server may round the predicted time at which the email will be opened, and/or should be sent, to the nearest hour or half-hour. Additionally or alternatively, the server may round times and/or predicted times to the nearest day, week, month, and/or any other contiguous and/or non-contiguous block of time.

Predicting a Target Behavior

A user may want to predict whether a particular target behavior will occur when a draft email is received by the intended recipient and/or an email client. For example, a user may want to know if an email recipient's email client is likely to classify the email as spam. In this case the user submits a request including the draft email recipient's address, the target behavior of identifying or classifying the email as spam, and the draft email components. For example, the components may include the subject and body of the email.

The server receives the request and parses the email components into words and phrases. Each word or phrase is compared to a previously generated list of words and phrases that are commonly identified with the target behavior, which in this example is spam. The server may generate a score reflecting the likelihood that the draft email will be identified as span. Additionally or alternatively, the server may suggest deleting the words or phrases that are more likely to cause an email client to classify the draft email as spam. Additionally or alternatively, the server may return suggestions of synonymous words and phrases that are less likely to cause an email client to classify the draft email as spam.

Also for example, a user may want to know which components of a draft email are most likely to lead to a recipient responding to the draft email. The user submits the request to the server with email data including the recipient's email address, the target behavior of responding to the email, the draft email, and/or components of the draft email The server retrieves additional recipient information and combines it with the email data. The server parses the email data and the additional data into feature inputs. The feature input may include one or more words and/or phrases from the draft email's title, subject, and/or body. The server inputs the features into the machine learning model.

The machine learning model may use natural language processing techniques, such as sentiment analysis, to score each word and/or phrase based on the likelihood the recipient to perform the target behavior, which in this case is responding to the draft email. For words and/or phrases with a low likelihood the server may retrieve synonymous words and phrases with a higher correlation to the target behavior and suggest them to the user. Additionally or alternatively, if the likelihood of a response is below a particular threshold, then the server may suggest using an alternate communication channel, such as a telephone.

In another example embodiment, the desired behavior may be made of multiple behaviors, or behaviors may be preconditions to the desired behavior. For example if the target behavior is for the recipient to respond to an email then a prerequisite behavior is for the email recipient to open the email. In these cases, the machine learning model may need to compute the likelihood for multiple actions that are interdependent. In these cases the machine learning model may utilize Hierarchical Based Sequencing or Multiple Output Relaxation in order to resolve multiple interdependent outputs.

While the foregoing written description of example embodiments of the invention enables one of ordinary skill to make and use what is considered presently to be the best mode thereof, those of ordinary skill will understand and appreciate the existence of variations, combinations, and equivalents of the specific embodiments, methods, and examples herein. The invention should therefore not be limited by the above described embodiments, methods, and examples, but by all embodiments and methods within the scope of the invention as claimed.

Hardware Overview

According to an embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
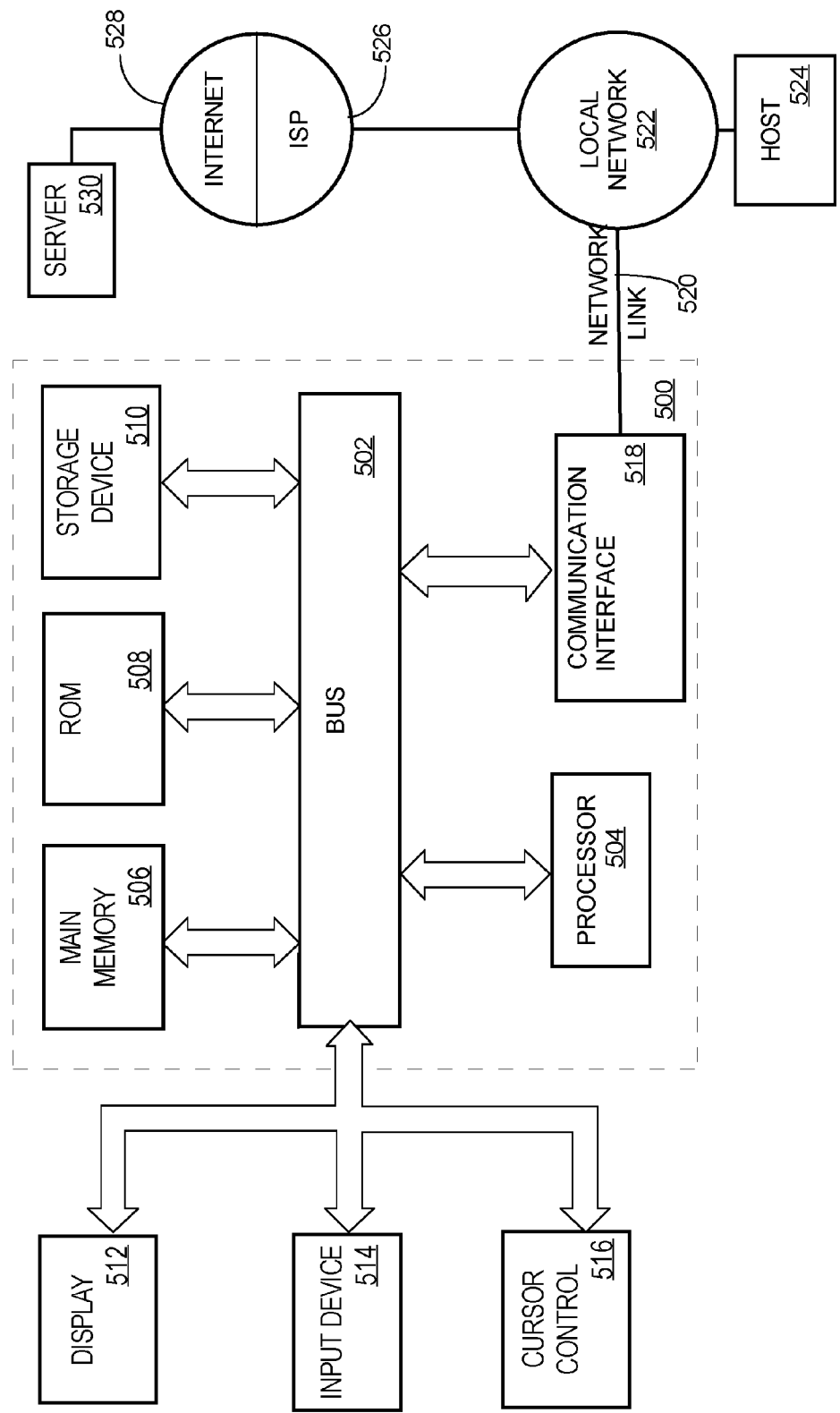
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to an embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Other Aspects of Disclosure

Various embodiments are described with reference to the accompanying drawings, which form a part hereof, and which show specific exemplary implementations for practicing various embodiments. However, other embodiments may be implemented in many different forms and should not be construed as limited to the embodiments set forth herein; rather, these embodiments are provided so that this disclosure will be thorough and complete. Embodiments may be practiced as methods, systems or devices. Accordingly, embodiments may take the form of a hardware implementation, an entirely software implementation, or an implementation combining software and hardware aspects. The descriptions and examples herein are for purposes of illustrating clear examples and are not intended to be limiting.

The logical operations may be performed in various embodiments. For example, embodiments of the invention could be practiced as a sequence of computer implemented steps running on a computing system and/or as interconnected machine modules within the computing system. The implementation is a matter of choice dependent on the performance requirements of the computing system implementing the embodiment. Accordingly, the logical operations making up the embodiments described herein are referred to alternatively as operations, steps or modules.

Embodiments disclosed herein relate to predicting email behavior related to marketing and sales, but those skilled in the art will understand that these embodiments could also be deployed to predict the behavior of email recipients in other settings.

What is claimed is:
1. A system comprising:
a memory;
one or more processors coupled to the memory and configured to:

receive an original draft message before the original draft message is presented to an intended recipient;
wherein a first text within at least one field of the original draft message has a first wording composed by a sending user,
determine that the original draft message belongs to a particular category based, at least in part, on a machine learning model;
select an alternative text that has been previously used in messages that belong to the particular category, and has experienced a higher rate of provoking a target behavior than the first text;
determine a second text to present to the sending user based, at least in part, on the alternative text;
wherein the second text to present to the sending user has a second wording;
wherein the second text to present to the sending user is determined based, at least in part, on stored behavior data that indicates the second wording is more likely than the first wording to cause a recipient to perform the target behavior;
wherein the second wording is different than the first wording; and
present the second text to the sending user.

2. The system of claim 1, wherein the one or more processors are configured to:
train the machine learning model;
wherein training the machine learning model comprises, for each sent message in a plurality of sent messages:
determining whether one or more identified recipients performed the target behavior in response to receiving the sent message; and
associating the sent message to a category of a plurality of categories.

3. The system of claim 2, wherein:
training the machine learning model further includes:
for each category of the plurality of categories:
determining a set of n-grams;
for each n-gram in the set of n-grams:
determining a score indicating a likelihood that a message with the n-gram is in the category;
determining the original draft message belongs to the particular category includes:
determining a plurality of n-grams from the original draft message;
for each category of the plurality of categories, determining a matching score based on the set of n-grams associated with the category and the plurality of n-grams from the original draft message;
determining the particular category has a higher matching score than other categories in the plurality of categories.

4. The system of claim 2, wherein:
training the machine learning model further includes, for each category of the plurality of categories, clustering each sent message associated with the category into a subcategory;
selecting the alternative text comprises:
determining that the original draft message belongs to a particular subcategory based, at least in part, on the machine learning model;
selecting the alternative text that has been previously used in messages that belong to the particular subcategory.

5. The system of claim 2, wherein:
each sent message of the plurality of sent messages is an abstracted message;
the alternative text is a particular abstracted message.

6. The system of claim 1, wherein determining the second text comprises replacing one or more first words in the alternative text with one or more second words in the original draft message.

7. The system of claim 1, wherein the one or more processors are configured to:
tag one or more first words in the alternative text with a first tag;
tag one or more second words in the original draft message with a second tag;
wherein the alternative text comprises the first tag at a first location in the alternative text and the second tag at a second location in the alternative text;
wherein generating the second text comprises:
inserting the one or more first words from the original draft message in the alternative text at the first location;
inserting the one or more second words from the original draft message in the alternative text at the second location.

8. The system of claim 7, wherein the first tag is a named entity tag.

9. The system of claim 7, wherein the second tag is a part of speech tag.

10. A method comprising:
receiving an original draft message before the original draft message is presented to an intended recipient;
wherein a first text within at least one field of the original draft message has a first wording composed by a sending user,
determining that the original draft message belongs to a particular category based, at least in part, on a machine learning model;
selecting an alternative text that has been previously used in messages that belong to the particular category, and has experienced a higher rate of provoking a target behavior than the first text;
determining a second text to present to the sending user;
wherein the second text to present to the sending user has a second wording;
wherein the second text to present to the sending user is determined based, at least in part, on stored behavior data that indicates the second wording is more likely than the first wording to cause a recipient to perform a target behavior;
wherein the second wording is different than the first wording; and
presenting the second text to the sending user,
wherein the method is performed by one or more computing devices.

11. The method of claim 10 comprising:
training the machine learning model;
wherein training the machine learning model comprises, for each sent message in a plurality of sent messages:
determining whether one or more identified recipients performed the target behavior in response to receiving the sent message; and
associating the sent message to a category of a plurality of categories.

12. The method of claim 11, wherein:
training the machine learning model further includes:
for each category of the plurality of categories:
determining a set of n-grams;
for each n-gram in the set of n-grams:
determining a score indicating a likelihood that a message with the n-gram is in the category;
determining the original draft message belongs to the particular category includes:

determining a plurality of n-grams from the original draft message;

for each category of the plurality of categories, determining a matching score based on the set of n-grams associated with the category and the plurality of n-grams from the original draft message;

determining the particular category has a higher matching score than other categories in the plurality of categories.

13. The method of claim 11, wherein:

training the machine learning model further includes, for each category of the plurality of categories, clustering each sent message associated with the category into a subcategory;

selecting the alternative text comprises:

determining that the original draft message belongs to a particular subcategory based, at least in part, on the machine learning model;

selecting the alternative text that has been previously used in messages that belong to the particular subcategory.

14. The method of claim 11 wherein:

each sent message of the plurality of sent messages is an abstracted message;

the alternative text is a particular abstracted message.

15. The method of claim 10, wherein determining the second text comprises replacing one or more first words in the alternative text with one or more second words in the original draft message.

16. The method of claim 10 comprising:

tagging one or more first words in the alternative text with a first tag;

tagging one or more second words in the original draft message with a second tag;

wherein the alternative text comprises the first tag at a first location in the alternative text and the second tag at a second location in the alternative text;

wherein generating the second text comprises:

inserting the one or more first words from the original draft message in the alternative text at the first location;

inserting the one or more second words from the original draft message in the alternative text at the second location.

17. The method of claim 16, wherein the first tag is a named entity tag.

18. The method of claim 16, wherein the second tag is a part of speech tag.

* * * * *